United States Patent
Yasuda et al.

(10) Patent No.: US 6,576,371 B1
(45) Date of Patent: Jun. 10, 2003

(54) SOLID ELECTROLYTE BATTERY

(75) Inventors: Toshikazu Yasuda, Kanagawa (JP);
Kazuhiro Noda, Kanagawa (JP);
Takeshi Horie, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/532,794

(22) Filed: Mar. 22, 2000

(30) Foreign Application Priority Data

Mar. 31, 1999 (JP) ............................................ 11-094149

(51) Int. Cl.⁷ .............................................. H01M 10/40
(52) U.S. Cl. ...................... 429/309; 429/315; 429/317
(58) Field of Search ................... 429/309, 315, 429/317

(56) References Cited

U.S. PATENT DOCUMENTS

| | | | | |
|---|---|---|---|---|
| 5,183,716 A | * | 2/1993 | Nakacho et al. ............. 429/315 |
| 5,426,005 A | * | 6/1995 | Eschbach .................... 429/309 |
| 5,437,942 A | * | 8/1995 | Murata et al. .......... 429/317 X |
| 5,837,157 A | * | 11/1998 | Kohjiya et al. ......... 429/317 X |
| 5,981,097 A | * | 11/1999 | Rajendran ............... 429/317 X |
| 6,162,563 A | * | 12/2000 | Miura et al. ................ 429/309 |
| 6,180,287 B1 | * | 1/2001 | Watanabe et al. .......... 429/312 |

* cited by examiner

Primary Examiner—Stephen Kalafut
(74) Attorney, Agent, or Firm—Sonnenschein, Nath & Rosenthal

(57) ABSTRACT

A solid electrolyte battery with improved utilization rate of electrodes and improved cycle characteristics, the solid electrolyte battery incorporating a positive electrode; a solid electrolyte layer formed on the positive electrode, the solid electrolyte layer having a multi-layer structure with a plurality of layers; and a negative electrode formed on the solid electrolyte layer, wherein a first solid electrolyte layer in the plurality of layers, the first solid electrolyte layer being the closest layer in the plurality of layers to the positive electrode, and the first solid electrolyte layer including a polymer having a glass transition point of −60° C. or lower when measured by using a differential scanning calorimeter and a number average molecular weight of 100,000 or larger, and at least one of the plurality of layers other than the first solid electrolyte layer being formed by crosslinking a polymer solid electrolyte having a functional group that can be crosslinked.

8 Claims, 1 Drawing Sheet

SOLID ELECTROLYTE BATTERY

RELATED APPLICATION DATA

The present application claims priority to Japanese Application No. P11-094149 filed Mar. 31, 1999 which application is incorporated herein by reference to the extent permitted by law.

BACKGROUND OF THE INVENTION

1. Field of the Invention

The present invention relates to a solid electrolyte battery, and more particularly to a solid electrolyte battery incorporating a solid electrolyte layer constituted by two or more layers of solid electrolyte layers.

2. Description of the Related Art

In recent years, a multiplicity of portable electronic apparatuses, such as camcoders, portable telephones and portable computers, have appeared. Reduction in the size and weight of the apparatus has been required. Raising of the energy density of the battery serving as a portable power source of the apparatus has been required. Among a variety of batteries, a battery of a type containing light metal, such as lithium, sodium or aluminum, as a negative-electrode active material, receives attention because of its high energy density.

Batteries of a type containing light metal, such as lithium, to serve as the negative-electrode active material and manganese dioxide ($MnO_2$), fluorocarbon [$(CF)n$] or thionyl chloride ($SOCl_2$) to serve as the positive-electrode active material have widely been used as power sources of electric calculators and clocks and backup power sources of memories. Secondary batteries have widely been used each of which incorporates a negative-electrode active material which is carbon material, such as graphite or low-crystalline carbon, which occludes/discharges lithium ions. Moreover, the foregoing secondary battery incorporates a positive-electrode active material constituted by a composite lithium oxide mainly composed of $Li_xMO_2$ (where M is one or more types of transition metal and x usually satisfies the relationship that $0.05 \leq x \leq 1.10$).

Moreover, research and development of solid electrolyte batteries each incorporating polyethylene oxide or polyphosphagen as the material of the electrolyte have energetically been performed. The solid electrolyte battery, which is free of leakage of electrolytic solution, has advantages that, for example, the structure of the battery can be simplified. Hitherto, the battery of the foregoing type has a layer structure expressed by positive-electrode active-material layer (formed by integrating a positive-electrode mix and a collector)/electrolyte layer (a solid electrolyte)/negative-electrode active material layer (formed by integrating a negative-electrode mix and a connector). Since the electrolyte layer enlarges the area of contact between the active-material layer and the electrolyte layer, either of the following methods is generally employed. That is, the electrolyte layer is formed by coating the active-material layer with a non-solidified electrolyte by a doctor blade method which is a representative method. As an alternative to this, the electrolyte layer is formed by causing a porous film or a unwoven cloth to contain an electrolyte.

The foregoing method of forming the solid electrolyte layer, such as the doctor blade method, wherein the active-material layer is coated with the non-solidified electrolytes cannot easily uniform the thickness of the solid electrolyte layer. Thus, the foregoing method suffers from a problem in that the thickness of the solid electrolyte layer is easily dispersed.

If a solid-electrolyte lithium secondary battery incorporates the solid electrolyte layer which has a nonuniform thickness, the mobility of lithium ions in the solid electrolyte layer is dispersed. Since battery reactions are concentrated on a portion in which the mobility of lithium ions is relatively high, that is, the thickness of the solid electrolyte layer is small. As a result, the battery capacity is reduced, causing the lifetime of the solid-electrolyte lithium secondary battery against charge-discharge cycles to be shortened. If a portion in which the solid electrolyte layer is very thin is present, the insulated state is broken down starting with the foregoing portion in a case where pressure is applied to the solid-electrolyte lithium secondary battery. It leads to a fact that the positive-electrode active-material layer and the negative-electrode active material layer are brought into contact with each other. Thus, an internal short-circuit occurs.

In a case where the electrolyte is formed into a film-like shape to uniform the thickness of the solid electrolyte layer, the solid electrolyte of a type having a high electric conductivity has a low glass transition point Tg because of the characteristics thereof. Therefore, the foregoing solid electrolyte is a soft electrolyte, causing internal short circuit to easily take place. Since the soft solid electrolyte cannot easily be formed into the film-like shape, the foregoing solid electrolyte cannot be employed from a viewpoint of practical use.

When the solid electrolyte is formed by causing an electrolyte to be contained in a porous film or an unwoven cloth, the electric conductivity of the solid electrolyte layer deteriorates because the porous film or the unwoven cloth incorporates the small-size pores by a small number. Thus, the effective resistance of the solid electrolyte layer is raised, causing the characteristics of the battery to deteriorate. Since the unwoven cloth has a structure that the amount of fibers per unit area (grammage) is nonuniform, the mobility of lithium ions is easily dispersed. Since battery reactions are concentrated on a portion in which the mobility of lithium ions is relatively high, that is, in a portion in which the grammage is very small, the battery capacity is reduced. Thus, the lifetime of the solid-electrolyte lithium secondary battery against charge-discharge cycles is shortened. If a portion in which the grammage is very small is present, the insulated state is broken down starting with the foregoing portion in a case where pressure is applied to the solid-electrolyte lithium secondary battery. It leads to a fact that the positive-electrode active-material layer and the negative-electrode active material layer are brought into contact with each other. Thus, internal short-circuit occurs. When a film-shape solid electrolyte is employed which is sufficiently hard to maintain a high electric conductivity and to prevent the internal short circuit, the area of contact between the electrode active material and the solid electrolyte layer is reduced. Therefore, the utilization rate of the electrode cannot be raised and the capacity of the battery is reduced. As a result, the lifetime against charge/discharge cycles is shortened and the load resistance deteriorates.

SUMMARY OF THE INVENTION

In view of the foregoing, an object of the present invention is to provide a solid electrolyte battery exhibiting a high utilization rate of the electrodes and satisfactory cycle characteristics.

The inventor of the present invention has energetically performed studies to achieve the foregoing object. Thus, lamination of at least two or more types of solid electrolytes which consists of a soft solid electrolyte having a high electric conductivity and a film-shape solid electrolyte which has a high electric conductivity and which is sufficiently hard to prevent internal short circuit has been detected. Thus, a fact has been found that a structure can be formed with which the area of contact between an electrode active-material layer and an electrolyte layer can be enlarged, the thickness of the electrolyte layer can be uniformed, internal short circuit can be prevented and ion conduction is not inhibited.

That is, according to one aspect of the present invention, there is provided a solid electrolyte battery comprising: a positive electrode; a solid electrolyte layer formed on the positive electrode, said solid electrolyte layer having a multi-layer structure with a plurality of layers; and a negative electrode formed on the solid electrolyte layer, wherein a first solid electrolyte layer in the plurality of layers, the first solid electrolyte layer being the closest layer in the plurality of layers to the positive electrode, and the first solid electrode layer including a polymer having a glass transition point of −60° C. or lower when measured by using a differential scanning calorimeter and a number average molecular weight of 100,000 or larger, and at least one of the plurality of layers other than the first solid electrolyte layer being formed by crosslinking a polymer solid electrolyte having a functional group that can be crosslinked.

As described above, the solid electrolyte layer of the layers constituting the solid electrolyte layer having the multi-layer structure which is nearest the positive electrode is constituted by a polymer having a glass transition point of −60° C. or lower when measurement is performed by using a differential scanning calorimeter and a number average molecular weight of 100,000 or larger. Therefore, the area of contact between the active-material layer and the electrolyte layer can be enlarged. Moreover, at least one of the layers constituting the solid electrolyte layer having the multi-layer structure except for the layer nearest the positive electrode is formed by crosslinking a polymer solid electrolyte having a functional group which can be crosslinked. Therefore, the thickness of the electrolyte layer can be uniformed so that internal short circuit occurring due to external pressure is prevented.

Other objects, features and advantages of the invention will be evident from the following detailed description of the preferred embodiments described in conjunction with the attached drawings.

DETAILED DESCRIPTION OF THE PREFERRED EMBODIMENTS

Figure 1:
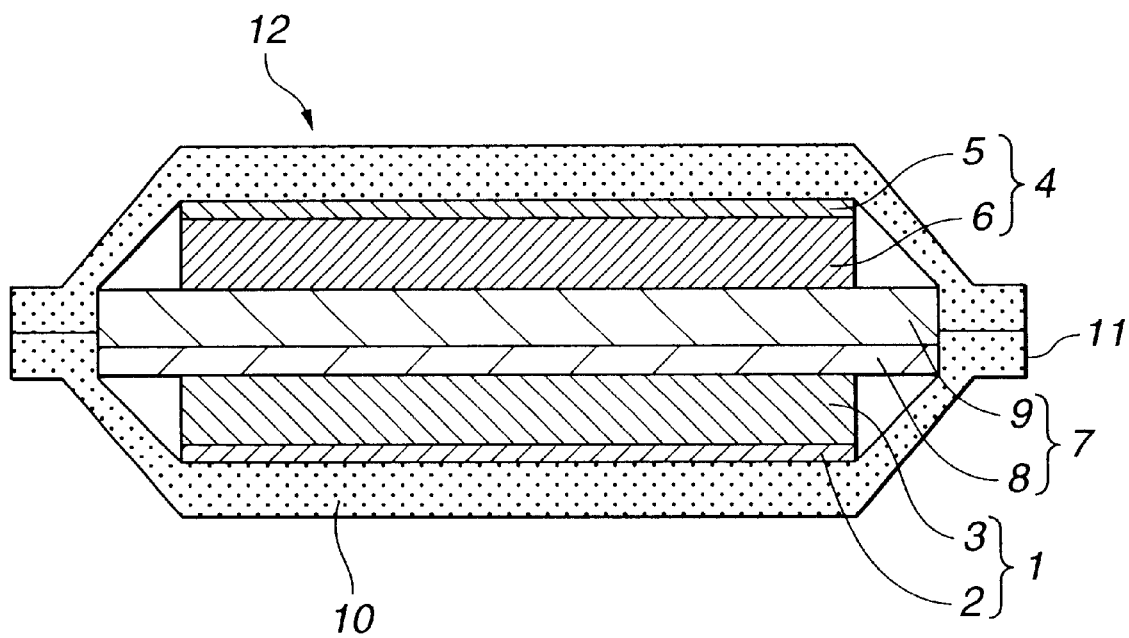
FIG. 1 is a cross sectional view showing the structure of a solid electrolyte battery according to an embodiment of the present invention.

A solid electrolyte battery according to the present invention will now be described.

FIG. 1 is a cross sectional view showing the structure of the solid electrolyte battery according to an embodiment of the present invention.

A thin-type solid electrolyte battery 12 according to the present invention incorporates a positive electrode 1 having a positive electrode collector 2 on which a positive-electrode active material 3 is formed. Moreover, the thin-type solid electrolyte battery 12 incorporates a solid electrolyte layer 7 formed on the positive electrode 1 and constituted by a two-layer structure consisting of a soft first solid electrolyte layer 8 having a high electric conductivity and a second solid electrolyte layer 9 which has a high electric conductivity and which is sufficiently hard to prevent internal short circuit. In addition, the thin-type solid electrolyte battery 12 incorporates a negative electrode 4 formed on the solid electrolyte layer 7 and incorporating a negative-electrode active material layer 6 formed on a negative electrode collector 5. The electrode laminate formed by laminating the foregoing layers in the foregoing order is closely sealed by a laminate film 10. A positive electrode terminal (not shown) is connected to the positive electrode collector 2, while a negative electrode terminal (not shown) is connected to the negative electrode collector 5. The terminals are sandwiched by a sealed portion 11 which is the peripheral portions of a laminate film 10.

The positive electrode collector 2 is constituted by a metal foil, such as aluminum foil, nickel foil or stainless steel foil. It is preferable that the metal foil is porous metal foil. When the metal foil is the porous metal foil, the adhesive strength between the collector and the electrode layer can be raised. The porous metal foil may be a punching metal, expand metal or metal foil having a multiplicity of openings formed by an etching process.

The positive-electrode active material for constituting the positive-electrode active material 3 is not limited if the positive-electrode active material permits light metal ions to be doped/dedoped. A metal oxide, a metal sulfide or a specific polymer may be employed to be adaptable to the type of a required battery.

When a lithium-ion battery is constituted, the positive-electrode active material may be a metal oxide or a metal sulfide, such as $TiS_2$, $MoS_2$, $NbSe_2$ or $V_2O_5$, which does not contain lithium. As an alternative to this, a composite lithium oxide may be employed which is mainly composed of $Li_xMO_2$ (where M is one or more types of transition metal and x is a value which varies depending on a charge/discharge state of the battery and which is usually not smaller than 0.05 nor larger than 1.10) or $LiNi_pM1_qM2_rMO_2$ (where each of M1 and M2 is at least one element selected from a group consisting of Al, Mn, Fe, Co, Ni, Cr, Ti and Zn or a non-metal element, such as P or B and p, q and r satisfy the relationship that p+q+r=1). It is preferable that transition metal M constituting the composite lithium oxide is Co, Ni or Mn. It is more preferable that a composite oxide of lithium and cobalt or a composite oxide of lithium and nickel is employed because high voltage and a high energy density can be obtained and excellent cycle characteristics can be realized. The composite oxide of lithium and cobalt or the composite oxide of lithium and nickel are exemplified by $LiCoO_2$, $LiNiO_2$, $LiNi_y Co_{1-y}O_2$ (where 0<y<1) and $LiMn_2O_4$. The positive-electrode active material 3 may be constituted by combining plural types of the foregoing positive-electrode active materials.

A binder, which is contained in the positive electrode, may be polyvinylidene fluororide (PVdF), polytetrafluoroethylene (PTFE) or a solid electrolyte to be described later.

The positive electrode contains a conductive material which may be graphite or the like.

The negative electrode collector 5 may be metal foil, such as copper foil, nickel foil or stainless steel foil. It is preferable that the metal foil is porous metal foil. When the metal foil is the porous metal foil, the adhesive strength between the collector and the electrode layer can be raised. The porous metal foil may be punching metal, expand metal or metal foil having a multiplicity of openings formed by an etching process.

The negative-electrode active material in the negative-electrode active material layer 6 is not limited if the negative-electrode active material permits ions to be doped/dedoped. The negative-electrode active material layer 6 contains the negative-electrode active material, a binder which is contained if necessary, and a conductive material. For example, alkali metal, such as lithium or sodium, an alloy containing the alkali metal or a material which permits alkali metal, such as lithium, to be doped/dedoped as charge/discharge reactions proceed. The latter material is exemplified by a conductive polymer, such as polyacethylene or polypyrrole, or a carbon material, such as pyrocarbon, cokes, carbon black, vitreous carbon, a material obtained by baking an organic polymer or carbon fibers. The material obtained by baking an organic polymer is a material obtained by baking an organic polymer material, such as phenol resin or furan resin, at an arbitrary temperature not lower than 500° C. in an inert gas or vacuum. The cokes may be petroleum cokes or pitch cokes. The carbon black is exemplified by acetylene black. It is preferable that the carbon material is employed because the carbon material exhibits a high energy density per unit volume.

The binder which must be contained in the negative electrode may be made of polyvinylidene fluoride (PVdF), polytetrafluoroethylene (PTFE) or a solid electrolyte to be described later.

The conductive material for use in the negative electrode may be graphite or the like.

It is preferable that the solid electrolyte for constituting the first solid electrolyte layer 8 is a polymer having a number average molecular weight of 100,000 or larger and a glass transition point of −60° C. or lower which is measured by the differential scanning calorimeter. Or, first solid electrolyte layer 8 comprises or an electrolyte salt which is soluble in the foregoing polymer. Thus, a soft characteristic is imparted to the first solid electrolyte layer. Therefore, the surface adjacent to the positive electrode is deflected along the shape of the positive-electrode active material. It results in the area of contact between the positive-electrode active material and the solid electrolyte being enlarged. Moreover, the state of contact can be improved, causing the utilization rate of the electrode of the solid electrolyte battery to be raised.

The reason why the number average molecular weight is made to be 100,000 or larger will now be described. When the number average molecular weight is made to be 100,000 or larger, the solid electrolyte does not contain polymers which can be crosslinked. The solid electrolyte can be solidified b only by interlocking of polymer chains.

The reason why the glass transition point of the polymer is made to be −60° C. or lower will now be described. When the glass transition point of the polymer is made to be −60° C. or lower, the solid electrolyte is able to maintain its flexible state over a wide temperature range. Moreover, the solid electrolyte is able to exhibit high ion conductivity. The solid electrolyte constituting the first solid electrolyte layer is composed of random copolymers and electrolyte salts which can be solved in the random copolymer. It is preferable that the foregoing solid electrolyte is composed of a random copolymer having the main chain structure which contains a structural unit having a structure expressed by the following chemical formula 4 and a structural unit expressed by the following chemical formula 5 and electrolyte salt which is soluble in the foregoing random copolymer.

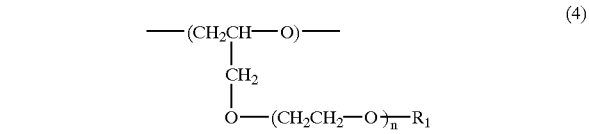

where $R_1$ is a group selected from a group consisting of an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl. In the foregoing chemical formula, structural units having different $R_1$ may be present in the same polymer chain. Note that n is an integer from 1 to 12.

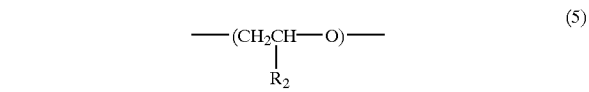

In the foregoing chemical formula, $R_2$ is an atom or a group selected from a group consisting of a hydrogen atom, an alkyl group, an alkenyl group, a cycloalkyl group, aryl group or an allyl group. In the foregoing chemical formula, structural units having different $R_2$ may be present in the same polymer chain. The alkyl group, the alkenyl group, cycloalkyl group, the aryl group and the allyl group may have a substitutional group.

The solid electrolyte for constituting the first solid electrolyte layer can be constituted by a polyphosphagen compound expressed by the following chemical formula 6 and having oligoxyethylene in the side chain thereof and an electrolyte salt which is soluble in the polyphosphagen compound.

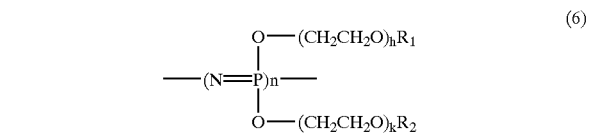

where each of $R_1$ and $R_2$ is a group selected from a group consisting of a methyl group, an ethyl group and a propyl group, h is the number of repetition of the oxyethylene units which satisfies $0 \leq h \leq 15$, k is the number of repetition of the oxyethylene units which satisfies $0 \leq k < 15$, and $n < 70$. In the foregoing chemical formula, the structural units having different R, may be present in the same polymer chain.

When the electrolyte salt is dissolved in the polymer and the electrolyte salt exhibits the ion conductivity, the electrolyte salt is not limited. When a lithium salt is employed as the electrolyte, a known lithium salt may be employed. The known lithium salt is exemplified by lithium hexafluorophosphate ($LiPF_6$), lithium perchlorate ($LiClO_4$), lithium hexafluoroarsenate ($LiAsF_6$), lithium tetrafluoroborate (LiBF4), lithium trifluoromethane sulfonate ($LiCF_3SO_3$) and bis trifluoromethylsulfonyl imide lithium [$LiN(CF_3SO_2)_2$]. Another alkali metal salt, such as sodium, may be employed as the electrolyte salt. It is preferable that the mixing ratio of the electrolyte salt and the random copolyuer is such that the value of A/B is not lower than 0.0001 nor higher than 5 on the assumption that the number of moles is A and the total number of moles of the ethylene oxide units is B.

The reason why the value of A/B is made to be 0.0001 or higher will now be described. If the value is lower than 0.0001, the electric conductivity of the solid electrolyte is too low to enable the battery to act.

The reason why the value of A/B is 5 or lower will now be described. If the value is higher than 5, the mixing ratio of the electrolyte salt with respect to the polymer is too high to prevent excess hardening of the solid electrolyte. Thus, the electric conductivity is too low to enable the battery to act.

The first solid electrolyte layer 8 having the above-mentioned structure is a soft layer because the first solid electrolyte layer 8 is made of the polymer having the number average molecular weight of 100,000 or larger and the glass transition point of −60° C. or lower measured by the differential scanning calorimeter. The first solid electrolyte layer 8, which is a soft layer, incorporates the surface adjacent to the positive electrode which is deflected along the shape of the positive-electrode active material when the thin-type solid electrolyte battery 12 is constituted. Therefore, the area of contact between the positive-electrode active material and the solid electrolyte can be enlarged. Moreover, the state of contact can be improved. Therefore, the utilization rate of the electrodes of the thin-type solid electrolyte battery 12 can be raised.

It is preferable that the solid electrolyte constituting the second solid electrolyte layer 9 is a material obtained by crosslinking a polymer solid electrolyte having a functional group which can be crosslinked. Thus, the second solid electrolyte layer 9 can be hardened to a degree with which the internal short circuit can be prevented The hard second solid electrolyte layer can be formed into a film-like shape. Therefore, when the thin-type solid electrolyte battery 12 is constituted, the hard characteristic and the film-like shape help the thickness of the electrolyte layer to be uniform. Moreover, when pressure has been applied, occurrence of internal short circuit caused from breakdown of the insulated state can be prevented. It is preferable that the solid electrolyte constituting the second solid electrolyte layer is composed of the foregoing random copolymer and the electrolyte salt which is soluble in the random copolymer. Moreover, it is preferable that the foregoing solid electrolyte is composed of a random copolymer having the structure of the main chain which includes the structural unit expressed by the following chemical formula 7 and the structural unit expressed by the following chemical formula 8 and the electrolyte salt which is soluble in the random copolymer.

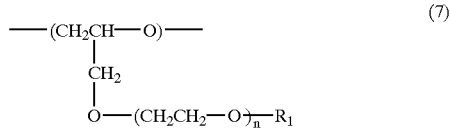

(7)

where $R_1$ is a group selected from a group consisting of an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl, and n is an integer from 1 to 12.

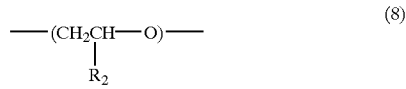

(8)

In the foregoing chemical formula, $R_2$ is an atom or a group selected from a group consisting of a hydrogen atom, an alkyl group, an alkenyl group, a cycloalkyl group, aryl group or an allyl group. In the foregoing chemical formula, structural units having different $R_2$ may be present in the same polymer chain. The alkyl group, the alkenyl group, cycloalkyl group, the aryl group and the allyl group may have a substitutional group.

Since the porous film and the unwoven cloth are not employed when the solid electrolyte is constituted, reduction in the electric conductivity of the electrolyte layer can be prevented.

Therefore, the solid electrolyte battery according to the present invention incorporates the solid electrolyte layer 7 constituted by the first solid electrolyte layer 8 and the second solid electrolyte layer 9 formed in this order from the positive electrode. Therefore, the area of contact between the active-material layer and the electrolyte layer can be enlarged. Moreover, the thickness of the electrolyte layer can be uniformed. As a result, a structure can be obtained with which occurrence of internal short circuit caused from external pressure can be prevented and ion conduction is not inhibited.

The foregoing solid-electrolyte-layer battery incorporates the solid electrolyte layer 7 formed into a two-layer structure consisting of the first solid electrolyte layer 8 and the second solid electrolyte layer 9. However, a similar effect can be obtained from a solid electrolyte battery according to the present invention and comprising: a positive electrode; a solid electrolyte layer formed on the positive electrode, said solid electrode layer having a multi-layer structure with a plurality of layers; and a negative electrode formed on the solid electrolyte layer, wherein a first solid electrolyte layer in the plurality of layers, the first solid electrolyte layer being the closest layer in the plurality of layers to the positive electrode, and the first solid electrode layer including a polymer having a glass transition point of −60° C. or lower when measured by using a differential scanning calorimeter and a number average molecular weight of 100,000 or larger, and at least one of the plurality of layers other than the first solid electrolyte layer being formed by crosslinking a polymer solid electrolyte having a functional group which that can be crosslinked.

The structure of the battery is not limited to the foregoing structure. The present invention may be applied to any one of a variety of structures including a coil-shape, a laminated shape, a cylindrical shape, a rectangular shape, a coin shape and a button shape to obtain similar effects.

EXAMPLES

Examples of the present invention will now be described by describing results of experiments. The conditions of the solid electrolyte layer were varied to manufacture four types of thin solid electrolyte batteries 12 according to Example 1 and Comparative Examples 1 to 3. The characteristics of the batteries were evaluated.

EXAMPLE 1

The thin-type solid electrolyte battery 12 incorporating the positive electrode 1, the negative electrode 4, the first solid electrolyte layer 8 and the second solid electrolyte layer 9 shown in FIG. 1 was manufactured.

Initially, 91 parts by weight of the composite lithium oxide $LiCoO_2$, 6 parts by weight of graphite serving, as the conductive material and 3 parts by weight of polyvinylidene fluoride serving as the binder were mixed with one another. Then, 1-methyl-2-pyrolidone serving as solvent was used to knead the solution. The obtained solution was applied to an aluminum-foil collector having leads and formed into a rectangular shape. Then, the solution was dried at 110° C., and then the structure was pressed. Thus, the positive electrode 1 was obtained.

Then, lithium foil having a thickness of 0.25 mm was cut to obtain rectangular foil. The rectangular foil was pressed against a copper collector having leads so that the negative electrode 4 was obtained.

Then, a solid random copolymer was prepared which was composed of 25 mol % of a structural unit having the main chain structured as expressed by the following chemical formula 9 and 75 mol % of a structural unit structured as expressed by the following chemical formula 10. The solid random copolymer had a number average molecular weight of 1,080,000 and the glass transition point measured by the differential scanning calorimeter of −60° C. Moreover, lithium tetrafluoroborate ($LiBF_4$) was weighed such that the value of A/B was 0.06 when the electrolyte salt and the random copolymer were mixed and the mole number of the electrolyte salt was A and the total mole number of the ethylene oxide unit was B. Then, the solid random copolymer and lithium tetrafluoroborate ($LiBF_4$) were dissolved in acetonitrile which was solvent. The solution was poured, and then vacuum drying was performed to remove acetonitrile. Then, a cast method was employed so that the first solid electrolyte layer 8 was formed on the positive electrode 1.

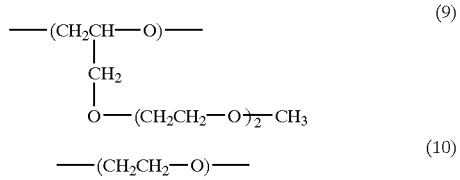

(9)

(10)

Then, a solid random copolymer was prepared which was composed of 20.6 mol % of structural unit having the main chain structured as expressed by the foregoing chemical formula 9, 77.5 mol % of a structural unit structured as expressed by the foregoing chemical formula 10 and 1.9 mol % of a structural unit structured as expressed by the following chemical formula 11 and which had a number average molecular weight of 820,000 was prepared. Moreover, a solid electrolyte obtained by mixing the $LiBF_4$ electrolyte salt and the random copolymer such that the value of A/B was 0.06 on the assumption that the mole number of the electrolyte salt was A and the total mole number of the ethylene oxide unit was B. A polymer solution was prepared in which a photosensitizer was dissolved in acetonitrile solution of the foregoing solid electrolyte. The obtained solution was uniformly applied to the first solid electrolyte layer 8. Then, acetonitrile was removed in the vacuum, and then ultraviolet rays were used to cause radical polymerization to occur and solidify the solution. Thus, the second solid electrolyte layer 9 was formed.

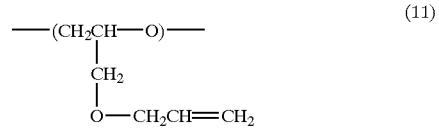

(11)

The negative electrode 4 was placed on the second solid electrolyte layer 8, and the structure was sealed by the laminate film 10 by reducing the pressure. As a result, the thin-type solid electrolyte battery 12 was manufactured.

COMPARATIVE EXAMPLE 1

A process similar to Example 1 was performed except for the structure in which the solid electrolyte layer 7 was constituted by only the first solid electrolyte layer 8 according to Example 1. Thus, the thin-type solid electrolyte battery 12 was obtained.

COMPARATIVE EXAMPLE 2

A process similar to Example 1 was performed except for the structure in which the solid electrolyte layer 7 was formed by causing a porous film to be impregnated with the solid electrolyte according to Example 1. Thus, the thin-type solid electrolyte battery 12 was obtained.

COMPARATIVE EXAMPLE 3

A process similar to Example 1 was performed except for the structure in which the solid electrolyte layer 7 was constituted by only the second solid electrolyte layer 9 according to Example 1. Thus, the thin-type solid electrolyte battery 12 was obtained.

COMPARATIVE EXAMPLE 4

A process similar to Example 1 was performed except for the structure in which the first solid electrolyte layer 8 and the second solid electrolyte layer 9 were manufactured. The electrolyte salt and the random copolymer were mixed in such a manner that the value of A/B was 0.00008 when the mole number of the electrolyte salt was A and the total mole number of the ethylene oxide unit was B. Thus, the thin-type solid electrolyte battery 12 was obtained.

COMPARATIVE EXAMPLE 5

A process similar to that according to Example 1 was performed except for the structure in which the first solid electrolyte layer 8 and the second solid electrolyte layer 9 were manufactured. The electrolyte salt and the random copolymer were mixed in such a manner that the value of A/B was 5.0002 when the mole number of the electrolyte salt was A and the total mole number of the ethylene oxide unit was B. Thus, the thin-type solid electrolyte battery 12 was obtained.

Evaluation of Characteristics

The manufactured thin-type solid electrolyte batteries 12 according to Example 1 and Comparative Examples 1 to 3 were subjected to charge/discharge tests under the following conditions to evaluate the characteristics. The tests were performed in a constant-temperature tank set to 50° C. A constant-current charge with a current density of 25 $mA/cm^2$ was continued until the voltage of the battery was raised to 4.25 V. Then, constant-voltage charge at 4.25 V was continued until the current density was raised to 1.25 $mA/cm^2$. Discharge was performed with a current density of 25 $mA/cm^2$ until the voltage of the battery was raised to 3.0 V.

Discharge capacities of the batteries measured at the 10-th cycle are shown in Table 1.

TABLE 1

| | utilization rate of positive electrode at 10-th cycle (%) |
|---|---|
| Example 1 | 99.8 |
| Comparative Example 1 | internal short circuit at 1st cycle charge |

TABLE 1-continued

| | utilization rate of positive electrode at 10-th cycle (%) |
|---|---|
| Comparative Example 2 | 92.1 |
| Comparative Example 3 | 89.6 |
| Comparative Example 4 | operation as the battery was impossible |
| Comparative Example 5 | operation as the battery was impossible |

As can be understood from results shown in Table 1, the thin-type solid electrolyte battery 12 according to Example and incorporating the solid electrolyte layer 7 which was constituted by the first solid electrolyte layer 8 and the second solid electrolyte layer 9 resulted in a very high utilization rate of the electrode of 99.8%.

The thin-type solid electrolyte battery 12 according to Comparative Example 1 and incorporating the solid electrolyte layer 7 constituted by only the first solid electrolyte layer 8 according to Example 1 encountered an internal short circuit at the first-cycle charge.

The thin-type solid electrolyte battery 12 according to Comparative Example 2 and incorporating the solid electrolyte layer 7 formed by causing the porous film to be impregnated with the solid electrolyte according to Example 1 resulted in insufficient battery capacity. Thus, the utilization rate of the electrode was unsatisfactorily low.

The thin-type solid electrolyte battery 12 according to Comparative Example 3 incorporating the solid electrolyte layer 7 constituted by only the second solid electrolyte layer 9 according to Example 1 resulted in unsatisfactory low utilization rate of the electrode.

The thin-type solid electrolyte battery 12 according to Comparative Example 4 was manufactured such that the first solid electrolyte layer 8 and the second solid electrolyte layer 9 were formed as follows: the electrolyte salt and the random copolymer were mixed such that the value of A/B was 0.00008 on the assumption that the mole number of the electrolyte salt was A and the total mole number of the ethylene oxide unit was B. The thin-type solid electrolyte battery 12 according to Comparative Example 4 has a battery capacity of zero even at the first cycle. That is, the foregoing battery cannot be operated as a battery.

The thin-type solid electrolyte battery 12 according to Comparative Example 5 was manufactured such that the first solid electrolyte layer 8 and the second solid electrolyte layer 9 were formed as follows: the electrolyte salt and the random copolymer were mixed such that the value of A/B was 5.0002 on the assumption that the mole number of the electrolyte salt was A and the total mole number of the ethylene oxide unit was B. The thin-type solid electrolyte battery 12 according to Comparative Example 4 has a battery capacity of zero even at the first cycle. Accordingly, the foregoing battery cannot be operated as a battery.

Then, the conditions of the solid electrolyte layer 7 were changed to manufacture four types of thin-type batteries 12 according to Example 2 and Comparative Examples 6 to 8 to evaluate the characteristics of the batteries.

EXAMPLE 2

Thin-type solid electrolyte battery 12 incorporating the positive electrode 1, the negative electrode 4, the first solid electrolyte layer and the second solid electrolyte layer shown in FIG. 1 was manufactured.

Initially, 91 parts by weight of the composite lithium oxide $LiCoO_2$, 6 parts by weight of graphite serving as the conductive material and 3 parts by weight of polyvinylidene fluoride serving as the binder were mixed with one another. Then, 1-methyl-2-pyrolidone serving as solvent was used to knead the solution. The obtained solution was applied to an aluminum-foil collector having leads and formed into a rectangular shape. Then, the solution was dried at 110° C., and then the structure was pressed. Thus, the positive electrode 1 was obtained.

Then, lithium foil having a thickness of 0.25 mm was cut to obtain rectangular foil. The rectangular foil was pressed against a copper collector having leads so that the negative electrode 4 was obtained. Then, a polyphosphagen compound having the main chain structured as expressed by the following chemical formula 12, a number average molecular weight of 1,800,000 and a glass transition point of −72° C. measured by the differential scanning calorimeter and lithium tetrafluoroborate ($LiBF_4$) serving as the electrolyte and weighed such that mixing ratio with respect to the polyphosphagen compound was 10 wt % were dissolved in solvent which was acetonitrile. Then solution was poured, and then vacuum drying was performed to remove acetonitrile. Then, a cast method was employed so that the first solid electrolyte layer 8 was formed on the positive electrode.

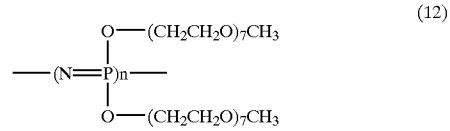

(12)

Then, a solid random copolymer was prepared which was composed of 20.6 mol % of structural unit having the main chain structured as expressed by the following chemical formula 13, 77.5 mol % of a structural unit structured as expressed by the foregoing chemical formula 14 and 1.9 mol % a structural unit structured as expressed by the following chemical formula 15 and which had a number average molecular weight of 820,000 was prepared. Moreover, a solid electrolyte obtained by mixing the LiBF4 electrolyte salt and the random copolymer such that the value of E/F was 0.06 on the assumption that the mole number of the electrolyte salt was E and the total mole number of the ethylene oxide unit was F. A polymer solution was prepared in which a photosensitizer was dissolved in acetonitrile solution of the foregoing solid electrolyte. The obtained solution was uniformly applied to the first solid electrolyte layer 8. Then, acetonitrile was removed in the vacuum, and then ultraviolet rays were used to cause radical polymerization to occur and solidify the solution. Thus, the second solid electrolyte layer 9 was formed.

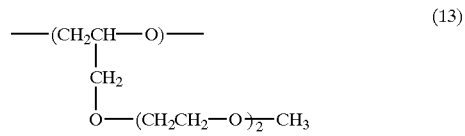

(13)

(14)

-continued

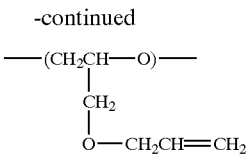
(15)

Then, the negative electrode 4 was placed on the second solid electrolyte layer 9, and then the structure was sealed by a laminate film by reducing pressure. Thus, the thin-type solid electrolyte battery 12 for use in the measurement was obtained.

COMPARATIVE EXAMPLE 6

A process similar to Example 3 was performed except for the structure. The solid electrolyte layer 7 in the structure was constituted by only the first solid electrolyte layer 8 according to Example 2. Thus, the thin-type solid electrolyte battery 12 was obtained.

COMPARATIVE EXAMPLE 7

A process similar to Example 2 was performed except for the structure. The solid electrolyte layer 7 in the structure was formed by causing a porous film to be impregnated with the first solid electrolyte according to Example 2. Thus, the thin-type solid electrolyte battery 12 was obtained.

COMPARATIVE EXAMPLE 8

A process similar to Example 2 was performed except for the structure. The solid electrolyte layer 7 in the structure was constituted by only the second solid electrolyte layer 9 according to Example 2. Thus, the thin-type solid electrolyte battery 12 was obtained.

Evaluation of Characteristics

The manufactured thin-type solid electrolyte batteries 12 according to Example 2 and Comparative Examples 6 to 8 were subjected to charge/discharge tests under the following conditions to evaluate the characteristics.

The tests were performed in a constant-temperature tank set to 50° C. A constant-current charge with a current density of 25 $\mu$A/cm$^2$ was continued until the voltage of the battery was raised to 4.25 V. Then, constant-voltage charge at 4.25 V was continued until the current density was raised to 1.25 $\mu$A/cm$^2$. Discharge was performed with a current density of 25 $\mu$A/cm$^2$ until the voltage of the battery was raised to 3.0 V.

Discharge capacities of the batteries measured at the 10-th cycle are shown in Table 2.

TABLE 2

| | utilization rate of positive electrode at 10-th cycle (%) |
|---|---|
| Example 2 | 99.8 |
| Comparative Example 6 | internal short circuit at 10-th cycle charge |
| Comparative Example 7 | 91.8 |
| Comparative Example 8 | 88.8 |

As can be understood from results shown in Table 2, the thin-type solid electrolyte battery 12 according to Example 2 incorporating two layers of electrolytes by using two types of solid electrolytes resulted in a very high utilization rate of the electrode of 99.8%.

The thin-type solid electrolyte battery 12 according to Comparative Example 6 and incorporating the solid electrolyte layer 7 constituted by only the first solid electrolyte layer 8 according to Example 3 encountered internal short circuit at the 10-th cycle charge.

The thin-type solid electrolyte battery 12 according to Comparative Example 7 and incorporating the solid electrolyte layer 7 formed by causing the porous film to be impregnated with the solid electrolyte according to Example 2 resulted in insufficient battery capacity. Thus, the utilization rate of the electrode was unsatisfactorily low.

The thin-type solid electrolyte battery 12 according to Comparative Example 8 incorporating the solid electrolyte layer 7 constituted by only the second solid electrolyte layer 9 according to Example 2 resulted in a low utilization rate of the electrode.

As described above, the thin-type solid electrolyte battery is formed between the positive electrode and the negative electrode. The solid electrolyte layer incorporates the solid electrolyte layer formed by laminating at least two types of solid electrolyte layers which consist of the soft solid electrolyte layer having the high electric conductivity and the solid electrolyte layer formed into the film-like shape which has a high electric conductivity and which is sufficiently hard to prevent internal short circuit. Thus, the state of contact between the electrode active-material layer and the electrolyte layer can be improved without any obstruction of ion conduction. The thickness of the electrolyte layer can be uniformed, and internal short circuit can be prevented. Thus, a high utilization rate of the electrode can be realized and the cycle characteristics can be improved.

As described above, the solid electrolyte battery according to the present invention comprises: a positive electrode; a solid electrolyte layer formed on the positive electrode, the solid electrolyte layer having a multi-layer structure with a plurality of layers; and a negative electrode formed on the solid electrolyte layer, wherein a first solid electrolyte layer in the plurality of layers, the first solid electrolyte layer being the closest layer in the plurality of layers to the positive electrode, and the first solid -electrode layer including a polymer having a glass transition point of −60° C. or lower when measured by using a differential scanning calorimeter and a number average molecular weight of 100,000 or larger, and at least one of the plurality of layers other than the first solid electrolyte layer being formed by crosslinking a polymer solid electrolyte having a functional group that can be crosslinked.

The solid electrolyte layer of the solid electrolyte layers in the form of the multi-layer structure which is nearest the positive electrode is a soft layer. Therefore, the surface of the foregoing solid electrolyte layer adjacent to the positive electrode is deflected along the shape of the positive-electrode active material. Therefore, the area of contact between the positive-electrode active material and the solid electrolyte can be enlarged. Moreover, the state of contact can be improved and the utilization rate of the electrode of the solid electrolyte battery can be raised.

At least one of the layers constituting the solid electrolyte layer having the multi-layer structure except for the solid electrolyte layer nearest the positive electrode is formed by crosslinking the polymer solid electrolyte having the functional group which can be crosslinked. Thus, a hard layer which is able to sufficiently prevent internal short circuit can be formed. Therefore, a film-like structure can be formed. At least one layer of the layers constituting the solid electrolyte layer having the multi-layer structure except for the lithium nearest the positive electrode is the hard and film-like layer. Therefore, the thickness of the electrolyte layer can be uniformed. Moreover, occurrence of internal short circuit owing to breakdown of the insulated state when pressure has been applied can be prevented.

Therefore, according to the present invention, the solid electrolyte battery can be provided which exhibits a high utilization rate of the electrode and excellent cycle characteristics because the area of contact between the active-material layer and the electrolyte layer can be enlarged, the thickness of the electrolyte layer can be uniformed, internal short circuit caused from external pressure can be prevented and the structure does not obstruct ion conduction.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A solid electrolyte battery comprising:
    a positive electrode;
    a solid electrolyte layer formed on said positive electrode, said solid electrolyte layer having a multi-layer structure with a plurality of layers;
    a negative electrode formed on said solid electrolyte layer; and
    a first solid electrolyte layer in said plurality of layers, said first solid electrolyte layer being the closest layer of said plurality of layers to said positive electrode, and said first solid electrode layer including a polymer having a glass transition point of −60° C. or lower when measured by using a differential scanning calorimeter and a number average molecular weight of 100,000 or larger, wherein
    at least one of said plurality of layers other than said first solid electrolyte layer is formed by crosslinking a polymer solid electrolyte having a functional group that can be crosslinked.

2. A solid electrolyte battery according to claim 1, wherein each of said plurality of layers includes a random copolymer containing a structural unit having a main chain structure expressed by the following chemical formula 1 and a structural unit expressed by the following chemical formula 2 and an electrolyte salt which is soluble in said random copolymer:

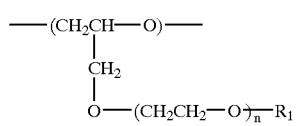

(1)

where, $R_1$ is a group selected from a group consisting of an alkyl group having 1 to 12 carbon atoms, an alkenyl group having 2 to 8 carbon atoms, a cycloalkyl group having 3 to 8 carbon atoms, an aryl group having 6 to 14 carbon atoms, an aralkyl group having 7 to 12 carbon atoms and a tetrahydropyranyl and n is an integer from 1 to 12

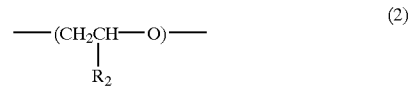

(2)

where $R_2$ is an atom or a group selected from a group consisting of a hydrogen atom, an alkyl group, an alkenyl group, a cycloalkyl group, aryl group or an allyl group.

3. A solid electrolyte battery according to claim 2, wherein a mixing ratio of said random copolymer and said electrolyte salt is determined such that the value of A/B is not smaller than 0.0001 nor larger than 5 when the mole number of said electrolyte salt is A and the total mole number of ethylene oxide units is B.

4. A solid electrolyte battery according to claim 1, wherein said first solid electrolyte layer is constituted by a polyphosphagen compound expressed by the following chemical formula 3 and having a side chain incorporates oligoxyethylene and an electrolyte salt which is soluble in said polyphosphagen compound:

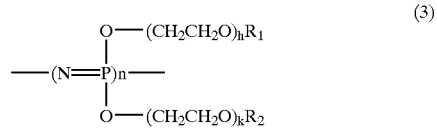

(3)

where each of $R_1$ and $R_2$ is a group selected from a group consisting of a methyl group, an ethyl group and a propyl group, h is the number of repetition of the oxyethylene units which satisfies 0<h<15, k is the number of repetition of the oxyethylene units which satisfies 0<h<15, and n<70.

5. A solid electrolyte battery according to claim 1, wherein said positive electrode is constituted by a material which permits light metal ions to be doped/dedoped.

6. A solid electrolyte battery according to claim 1, wherein said negative electrode is constituted by any one of a light metal, an alloy containing a light metal, and a material which permits light metal ions to be doped/dedoped.

7. A solid electrolyte battery according to claim 1, wherein
    said solid electrolyte layer has a two-layer structure incorporating a said first solid electrolyte layer and a second solid electrolyte layer formed in this order from said positive electrode,
    said first solid electrolyte layer constituting a polymer having a glass transition point of −60° C. when measured by using a differential scanning calorimeter and a number average molecular weight of 100,000 or larger, and
    said second solid electrolyte layer is being formed by crosslinking a polymer solid electrolyte having a functional group that can be crosslinked.

8. A solid electrolyte battery according to claim 1, wherein said first solid electrolyte layer is a relatively soft solid electrolyte layer and said at least one of said plurality of layers other than said first solid electrolyte layer is a relatively hard solid electrolyte layer.

* * * * *